3,491,080
**PROCESS FOR RECOVERING NUTRITIONAL ELE-
MENTS FROM FISH BY TREATMENT WITH CAL-
CIUM HYDROXIDE**
Carl Henrik Gösta Ehrensvärd and Bo Vilhelm Löfqvist,
Lund, and Lars-Börje Sjöberg, Eksjo, Sweden, assignors
to Astra Nutrition Aktiebolag, Molndal, Sweden, a
company of Sweden
No Drawing. Filed Mar. 30, 1967, Ser. No. 626,941
Claims priority, application Sweden, Apr. 7, 1966,
4,822/66
Int. Cl. C07g 7/00; C08h 1/00
U.S. Cl. 260—112                                        8 Claims

ABSTRACT OF THE DISCLOSURE

A process for disintegrating organic material into its main nutritional constituents of fats, proteins, salts, nucleotides and undissolvable solids, and separating them for nutritional use. The process comprises adding to organic material a solution of calcium and hydroxide ions in water, blending the mixture to extract the nutritional constituents and separating the resulting extracted constituents by centrifugation and precipitation.

---

This invention relates to the treatment of organic material to separate and recover the nutritional constituents therefrom, and more particularly to a process for disintegrating organic material, preferably fish or aquatic animals, into its main components of proteins, nucleotides, fats, salts and solids, and recovering each component in its most nutritionally usable form.

Methods known in the prior art for processing organic material, such as fish and aquatic animals, have been directed primarily toward the production of either fats or protein. In general, one of the two components has been prepared in pure form at the expense of contaminating or destroying the other. In the preparation of protein from organic sources, the use of alkalies in an alkaline medium to bring the proteins into solution is known. The rate of extraction of the proteins from the organic material is a direct function of the concentration of hydroxyl ions, and prior art methods have required very large concentrations of hydroxyl ions to completely extract the proteins. The presence of such large hydroxyl ion concentrations, however, causes a partial degradation of the proteins into peptides and the destruction of such nutritionally important amino acids as methionine, cysteine, serine and treonine. A further requirement common to several prior art methods is an extended extraction period lasting several hours, at comparatively high temperatures of 60° C. to 100° C. Both these conditions cause deterioration of the proteins, fats and nucleotides.

It is an object of the present invention to provide a process whereby the main components of organic materials are resolved into their most nutritionally usable form and separated for further use. It is a further object to provide a process for extracting proteins from organic materials in a low concentration of hydroxyl ions. It is still another object to provide a process for disintegrating organic materials requiring a short extraction period at comparatively low temperatures.

According to the invention, the objectives stated above are attained by placing organic material with water in a heatable container. A suspension of calcium ions in a slightly alkaline solution is added to the organic material, and the mixture is blended, preferably in the absence of air. Upon completition of the blending step, the blended organic mixture is first filtered to remove undisolved solids, and then centrifuged into three phases, an oil phase, a sludge phase and an intermediate phase containing 90–95% of the proteins and the greater part of the nucleotides. The three phases are separated and the proteins are precipitated from the intermediate third phase by lowering the pH or by heating. The nucleotides are separated from the resulting mother liquor by suitable means, such as coal screening. If desired, the proteins and nucleotides may be dried by known means.

The type of organic material suitable for use in this process is not limited to fish and aquatic animals, although these are the preferred sources of proteins and oils. Any type of organic material may be used. Even soybeans afford excellent source material for use with the process.

The physical state of the organic material is not critical. The material may be fresh or frozen, although it is preferred to comminute the material prior to use, since the smaller pieces afford a larger surface area for a faster extraction to completion.

According to the process of the invention, it is neither necessary nor advisable to add large amounts of hydroxyl ions to the organic material during extraction. It has been found that it is advantageous to use a source of hydroxyl ions which ties up the hydroxyl ions in excess of a low concentration and releases more ions as they hydrolyse the material. In this manner a low concentration of hydroxyl ions is maintained throughout the extraction and none of the deleterious side effects of protein and amino acid degradation occur. Calcium hydroxide ($Ca(OH)_2$) has been found to be an excellent source of potential hydroxyl ions for use in the process. Due to its low solubility in water under the conditions of the present process, an excess of calcium hydroxide does not cause a large concentration of hydroxyl ions. The calcium hydroxide remains largely undissolved and it releases hydroxyl ions to the solution as the ions are consumed by the extraction, thus maintaining a relatively low hydroxyl ion concentration. The hydroxyl ion concentration in the process varies between $10^{-2}$ and $10^{-3}$ mol. per liter (pH of about 11–12).

Prior art uses of calcium hydroxide in treating organic materials have been limited to production of an alkaline protein hydrolysate from such organic materials as fish waste. Amounts of calcium hydroxide, which are fifty times in excess of that used in the present process, are employed in these prior art methods and at temperatures of 100° C. The relatively low hydroxyl ion concentration employed in the present process avoids the decomposing effects inherent in the use of large amounts of calcium hydroxide necessary under the prior art conditions.

The propensity of calcium ions to stabilize proteins at low concentrations has been found to provide several unexpected advantages to the process of the invention. The presence of calcium-stabilized proteins gives the solution a lower viscosity than it normally would have. This permits rather high protein concentrations without an accompanying increase in viscosity to obstruct the fat extraction. The proteins are stabilized against heat precipitation, which allows a rapid heating of the solution without any hydrolytic side effects. This property may be advantageously used to permit sterilization of the protein solution.

The presence of calcium ions in low concentrations also broadens the pH range within which proteins can be separated from solution by precipitation. Complete precipitation is obtained normally between pH 4 and 6. In the presence of calcium ions complete precipitation may be achieved between pH 4 and 9.

Calcium hydroxide has been referred to as a preferred source of calcium and hydroxyl ions, but other sources may be used, such as calcium oxide (CaO) or a combination of calcium chloride ($CaCl_2$) and sodium hydroxide ($2NaOH$).

The preferred amounts of calcium oxide to organic material and water are 5 to 25 grams of calcium oxide per kilogram of organic material and 7.5 liters of water.

The blending of the organic material and calcium hydroxide is preferably carried out in the absence of air. A high content of dispersed air causes the formation of a complex conglomerate of lipids, proteins and air which increases the viscosity of the solution. The presence of the conglomerate causes incomplete separation of the three phases during the centrifugation step.

The blending phase of the process should be carried out quickly and at a moderate temperature. It has been found that the mixture can be completely blended within a maximum of about 10 minutes at a temperature of between 20° C. and 40° C., preferably 30° C. to 40° C. It should be noted that treatment of organic material during an extended time period in a very alkaline medium can cause destruction, denaturation, or a partial hydrolysis of the protein. The risk of such undesirable consequences is particularly great above 40° C. under ordinary circumstances, but the presence of the stabilizing calcium ions protects the protein even at higher temperatures.

Following the blending phase the undissolvable solids are filtered out and the solute is centrifuged to produce three phases. The oil phase and the sludge phase are drawn off from the intermediate protein phase for further processing according to means known in the art. The protein phase is then either acidified to a pH of between 4 and 9, or is heated. The proteins precipitate under both conditions and may be dried. The nucleotides may be precipitated from the solution by known means, such as coal screening, and then further processed for nutritional use.

The following example illustrates the process of the invention, but does not limit the scope of the invention in any way.

EXAMPLE I

A suspension of calcium hydroxide, corresponding to 2.0–3.5 kilograms of calcium oxide per 750 liters of fresh water, or 3.5–5.0 kilograms of calcium oxide to 750 liters of saline water, is added to 250 kilograms of fresh fish such as tuna, cod, herring or mackerel, and the mixture is then homogenized under exclusion of air for two minutes. The resulting homogenized solution is opaque and free-flowing, having a pH value of between 11.5 and 12.0. The solution is then filtered through a metal sieve to remove the skeletal parts and other large undissolvable solids. The resulting solution is centrifuged to produce three phases, (A) a fat phase containing 93–97% of the total amount of fat and 98–100% of the neutral fats, (B) a sludge phase comprising finely minced skeletal parts, collagens, cell membranes, and pigment tissue, and (C) an intermediate phase containing 90–95% of the proteins in solution and a greater part of the nucleotides. The three phases are separated by a centrifuge and the dissolved proteins in the intermediate phase are precipitated by lowering the pH to within the range of 9 to 4, or by heating the solution. The precipitated proteins are filtered from the solution by known means and dried to powder form. The nucleotides are then separated from the supernatant liquor by coal screening and the remaining solution is vaporized.

We claim:

1. A process for recovering valuable constituents from fish and other aquatic animal material containing oil, nucleotides and insoluble tissue material comprising treating the material with an alkaline aqueous medium in the presence of calcium ions having a pH in the presence of said material between about 11 and 12, calcium being present in an amount equivalent to CaO in the range between about 5 and 25 grams per kilogram of material, the treatment being carried out at a temperature between about 20 and 40° C. with homogenization in the substantial absence of air for a time sufficient to liberate the oil and extract the protein without substantial degradation thereof centrifuging the resulting mixture to form three phases, namely an oil phase, a sludge phase and an intermediate phase containing the extracted protein, separating these phases, and precipitating the protein from the phase containing it.

2. A process as described in claim 1, wherein the mixture is filtered, centrifuged into three phases, a fat phase, a sludge phase and an intermediate protein phase, the protein phase is acidified to pH 4–9 to precipitate the proteins.

3. A process as described in claim 2, wherein the protein phase is heated to precipitate the proteins.

4. A process as described in claim 2, wherein the nucleotides are separated from the intermediate phase.

5. A process as described in claim 1, wherein the treatment is conducted for a period of about 2 to about 10 minutes at a temperature between 20° C. and 40° C.

6. A process as described in claim 1, wherein the calcium and hydroxyl ions are added to the organic material in the form of chemical compounds selected from the group consisting of calcium oxide and calcium hydroxide.

7. A process as described in claim 1, wherein from about 8 to about 14 grams of calcium oxide are added per kilogram of organic material and 3 liters of fresh water.

8. A process as described in claim 1, wherein from about 14 to about 20 grams of calcium oxide are added per kilogram of organic material and 3 liters of saline water.

References Cited

UNITED STATES PATENTS

| | | | |
|---|---|---|---|
| 954,050 | 4/1910 | Schwickerath | 99—18 |
| 1,101,513 | 6/1914 | Adler | 99—18 |
| 2,304,099 | 12/1942 | Julian et al. | 260—123.5 |
| 2,383,252 | 8/1945 | Huntzicker | 260—123.7 X |
| 2,368,623 | 2/1945 | Tresise et al. | 260—123.7 X |
| 2,405,438 | 8/1946 | Levin | 260—123.5 X |
| 2,554,479 | 5/1951 | Wolff | 260—112 |
| 2,851,356 | 9/1958 | Bedford | 99—7 |
| 2,588,392 | 3/1952 | Julian et al. | 260—123.5 |
| 2,607,767 | 8/1952 | Vassell | 260—123.5 |
| 2,785,155 | 3/1957 | Anson et al. | 260—123.5 |
| 3,218,173 | 11/1965 | Loewenstein | 99—19 |
| 3,352,841 | 11/1967 | Lyon | 260—112 |
| 2,875,061 | 2/1959 | Vogel et al. | 99—7 |

OTHER REFERENCES

Chem. Abstracts, vol. 46, 1952, 11512c–e, Le Ianital francais.

Chem. Abstracts, vol. 57, 1962, 3682i, 3683a, Ionescu et al.

Chem. Abstracts, vol. 58, 1963, 11898e–f, Zaleski et al.

WILLIAM H. SHORT, Primary Examiner

HOWARD SCHAIN, Assistant Examiner

U.S. Cl. X.R.

99—18; 260—123.5, 123.7, 412, 412.7